Nov. 13, 1962  R. R. GRAVES  3,063,845
STERILIZED LIQUID FOOD PRODUCT PACKAGING
AND PACKAGE RESULTING THEREFROM
Filed Aug. 25, 1958  5 Sheets-Sheet 1
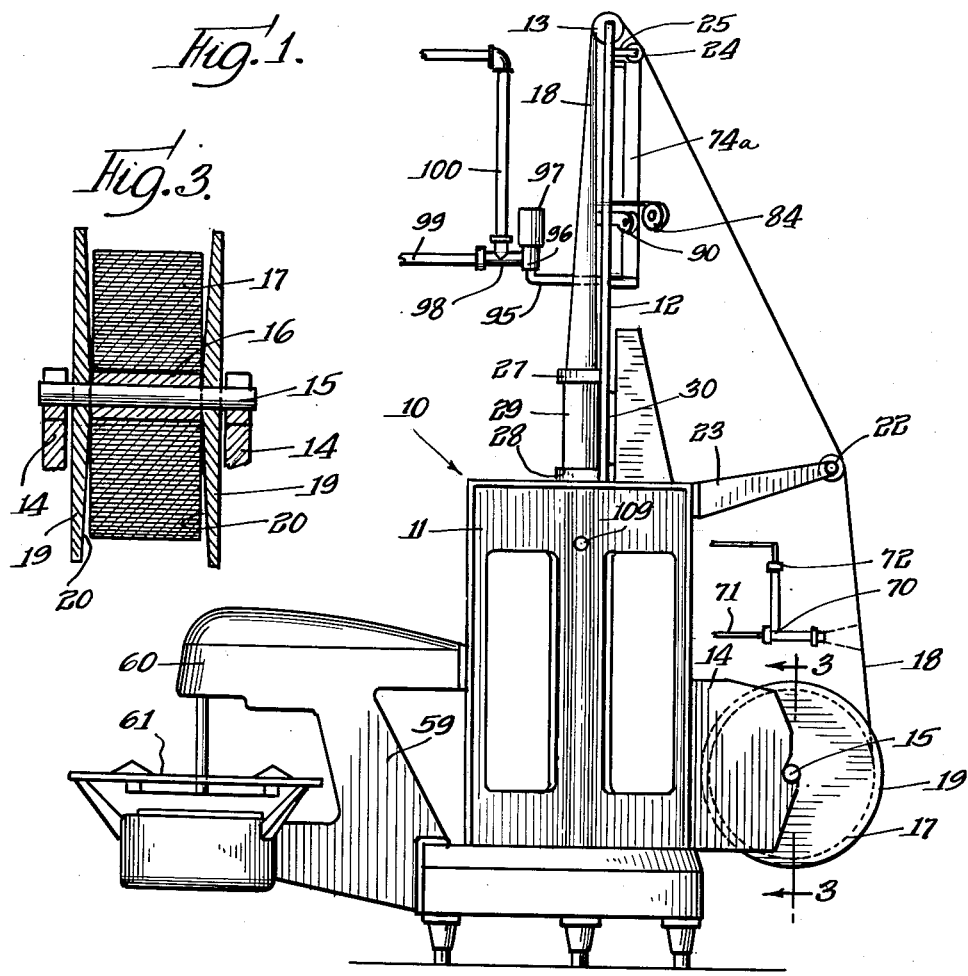
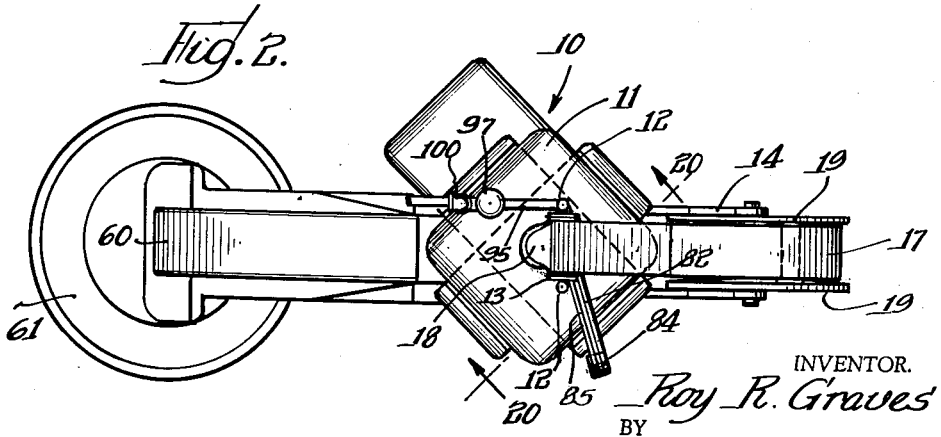
INVENTOR.
Roy R. Graves
BY
Wallenstein & Spangenberg
attys Nov. 13, 1962
R. R. GRAVES
3,063,845
STERILIZED LIQUID FOOD PRODUCT PACKAGING
AND PACKAGE RESULTING THEREFROM
Filed Aug. 25, 1958
5 Sheets-Sheet 2
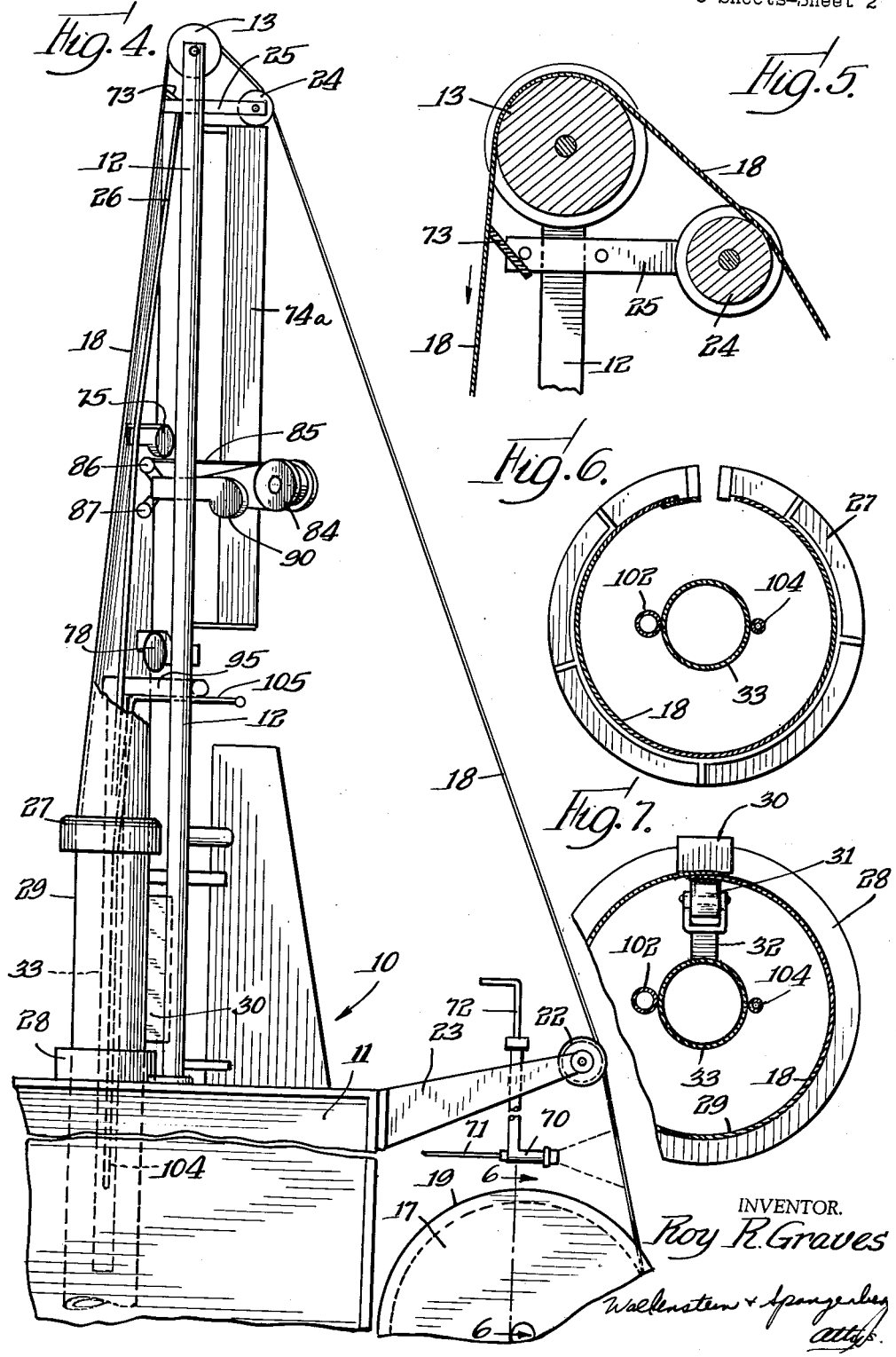
INVENTOR.
Roy R. Graves
Wallenstein & Spangenberg
attys.

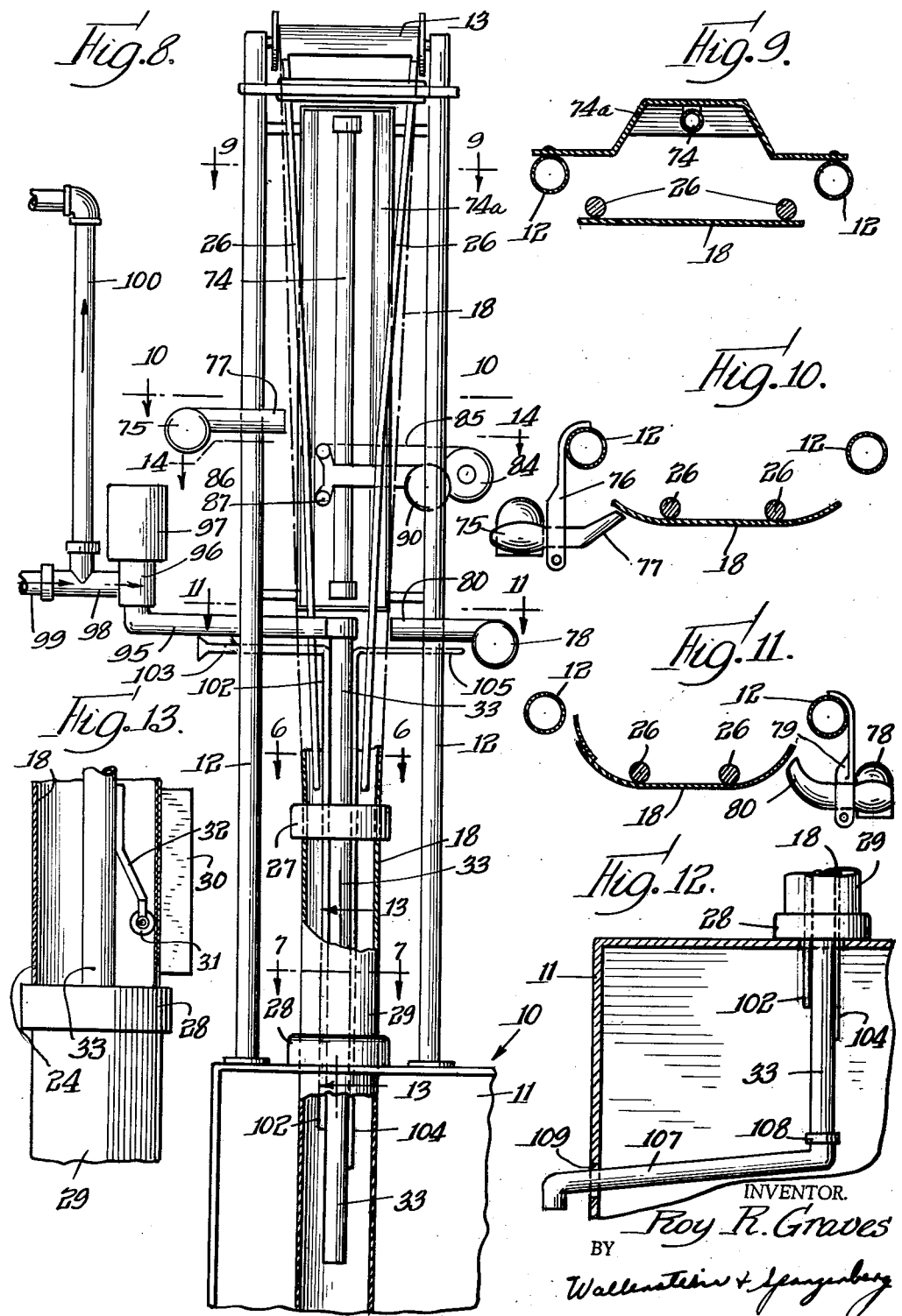

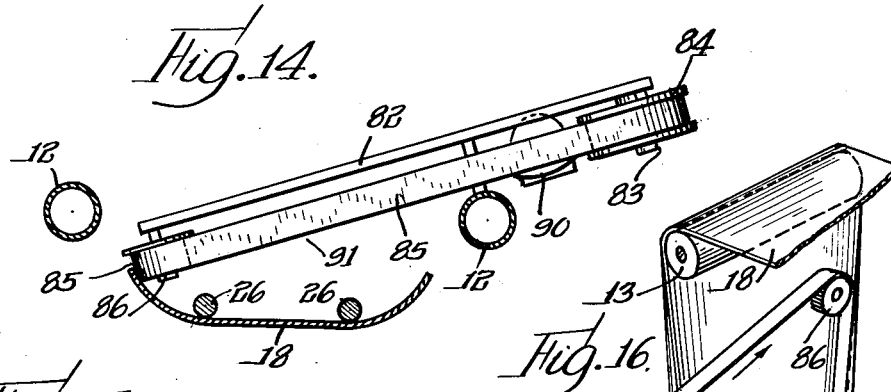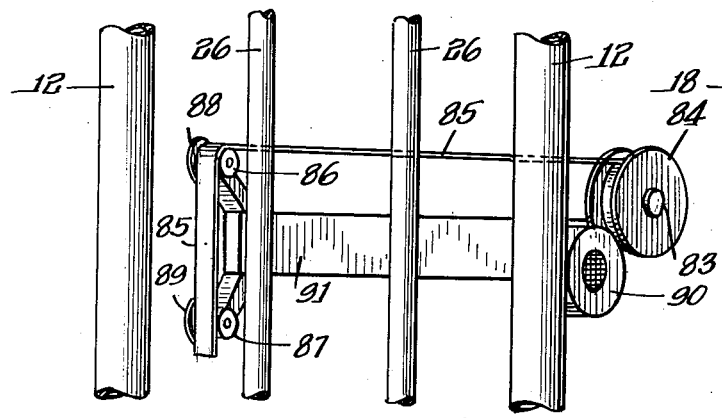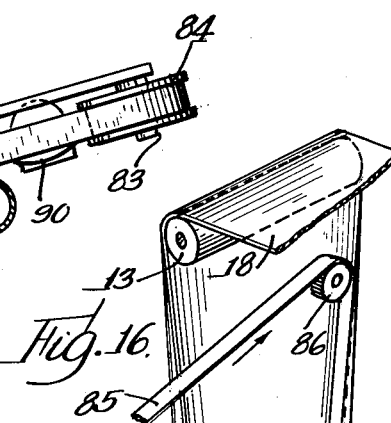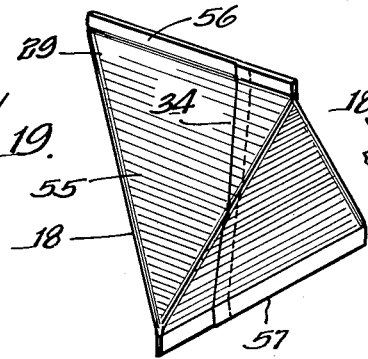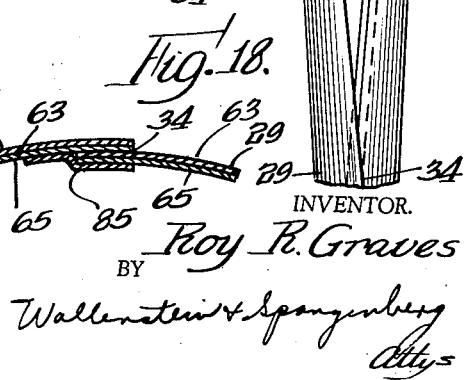

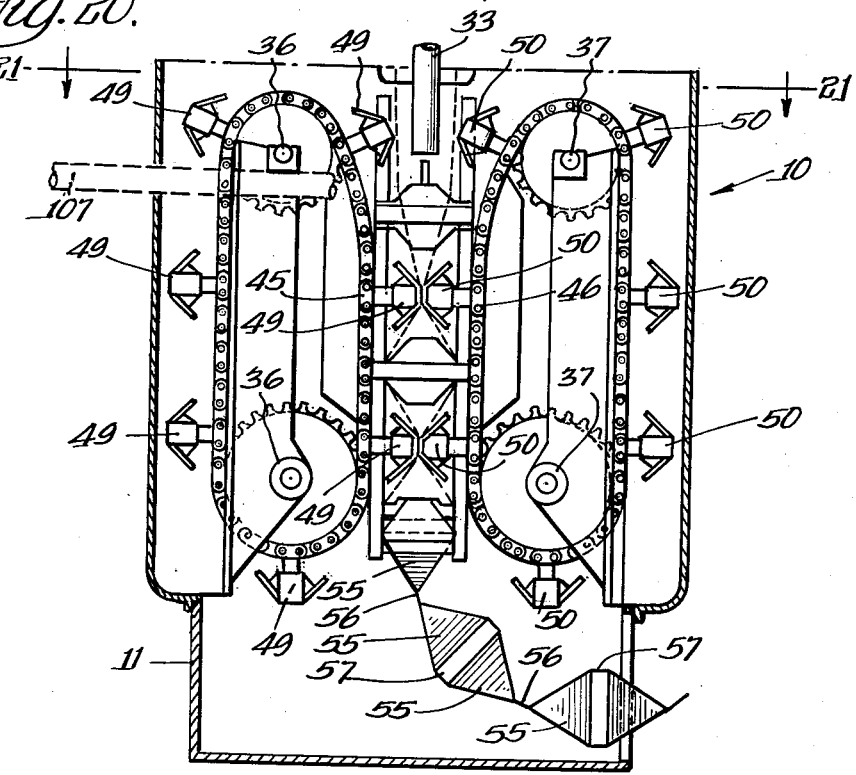
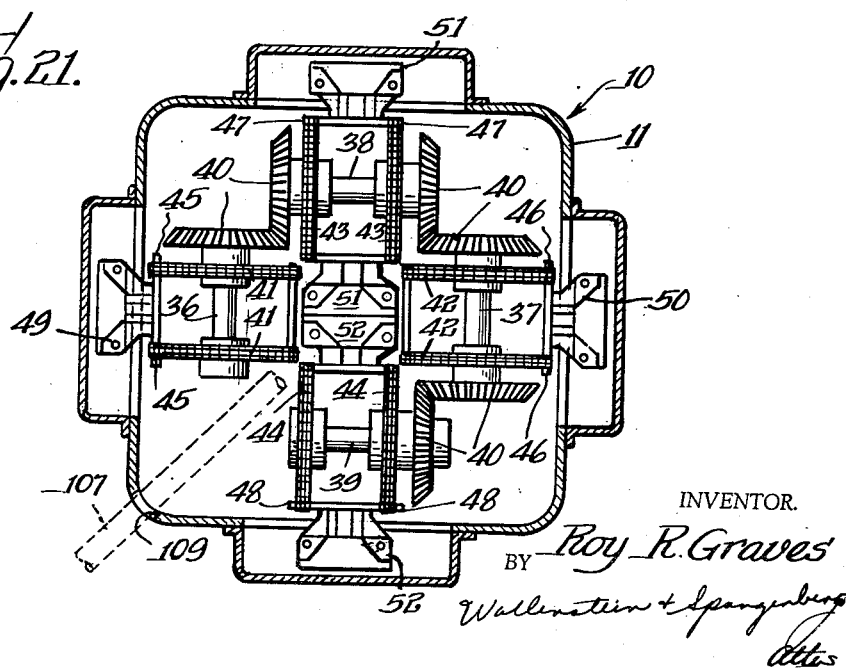

United States Patent Office 3,063,845
Patented Nov. 13, 1962

3,063,845
STERILIZED LIQUID FOOD PRODUCT PACKAGING AND PACKAGE RESULTING THEREFROM
Roy R. Graves, Germantown, Md., assignor to The Graves-Stambaugh Corporation, a corporation of Delaware
Filed Aug. 25, 1958, Ser. No. 757,023
8 Claims. (Cl. 99—171)

The principal objects of this invention are to produce a gas and liquid impervious paper type package having aseptically packaged therein for long time keeping without refrigeration a sterilized liquid food product which is subject to deterioration upon contact with extraneous oxygen, and to provide a method for so doing.

The liquid food product may be any desired product, such as a fruit product, a vegetable product, a milk product or the like, and the latter may be whole milk, cream, skim milk, concentrates, mixes, formulae or the like. The liquid food product may be provided with a low oxygen content in any desired manner as by processing it in the absence of air and removing oxygen by deaerating or the like. It may be sterilized in any desired manner, as by continuous short-time high-temperature heat treatment. One manner of processing the liquid food product, such as a milk product, to sterilize the same by heat treatment and produce a low oxygen content therein, so that it may be kept for a long time without refrigeration and without deterioration, is disclosed in Roy R. Graves Patent No. 2,772,979, issued December 4, 1956. As shown in that patent it has been the practice to aseptically package the low oxygen content liquid food product in heat sterilized cans, the cans effectively preventing extraneous oxygen from contacting the liquid food product therein so as to provide long shelf life. However, due to the high and rising costs of cans, the resultant cost of the packaged liquid food product has become comparatively high. Also, the heat sterilizing of the cans, the cans being hot when they are aseptically filled with the sterile liquid food product, has caused somewhat of a cooked flavor in the packaged product.

Packaging of liquid food products in paper type containers has been done for years on a large scale and has proven to be an inexpensive manner of marketing such products. Many different packaging methods of this kind have been followed, one such method being disclosed in R. Rausing Patent No. 2,741,079, issued April 10, 1956, and Harry S. V. Jarund Patent No. 2,738,631, issued March 20, 1956. These patents disclose a method of continuously forming paper type packages and of continuously filling the packages, as they are formed, with a liquid food product, an extremely efficient packaging method. However, this method of packaging liquid food products in paper type containers, and other such known methods, are not capable of aseptically packaging for long time keeping without refrigeration a sterilized liquid food product which is subject to deterioration upon contact with extraneous oxygen, and they have not been utilized for this purpose for the reasons that heat treatment and sterilization problems, aseptic packaging problems and problems of effectively preventing extraneous oxygen from contacting the liquid food product in the packages have been substantially insurmountable.

By reason of the instant invention, the foregoing problems and deficiencies have been solved and remedied and it is now possible, by reason of this invention, to commercially aseptically package for long time keeping without refrigeration a sterilized liquid food product having low oxygen content and which is subject to deterioration upon contact with extraneous oxygen in type, such as paper type containers. As a result, a low cost packaged product with minimum cooked flavor is made possible.

Briefly, this invention contemplates the production of sterile and gas and liquid impervious paper type containers and the aseptic filling of such containers with said sterilized liquid food product in an uncontaminated gas atmosphere which does not react unfavorably with the liquid food product, such as nitrogen or the like. Further objects of this invention reside in the construction of the sterile and gas and liquid impervious paper like containers, and in the method for the production of such packages and the aseptic filling of the same.

Other objects and advantages of this invention will become apparent to those skilled in the art upon reference to the accompanying specification, claims and drawings in which:

FIG. 1 is a side elevational view of a packaging machine, which may be of the type disclosed in the aforementioned Patent Nos. 2,741,079 and 2,738,631, showing features of the instant invention applied thereto.

FIG. 2 is a top plan view of the machine illustrated in FIG. 1.

FIG. 3 is a sectional view taken substantially along the line 3—3 of FIG. 1.

FIG. 4 is an enlarged elevational view of the upper portion of the machine illustrated in FIG. 1.

FIG. 5 is an enlarged sectional view through the top part of the machine illustrated in FIGS. 1 and 4.

FIG. 6 is a horizontal sectional view taken substantially along the line 6—6 of FIG. 8.

FIG. 7 is a horizontal sectional view taken substantially along the line 7—7 of FIG. 8.

FIG. 8 is a side elevational view of the upper portion of the machine looking from the left of FIG. 4.

FIG. 9 is a horizontal sectional view taken substantially along the line 9—9 of FIG. 8.

FIG. 10 is a horizontal sectional view taken substantially along the line 10—10 of FIG. 8.

FIG. 11 is a horizontal sectional view taken substantially along the line 11—11 of FIG. 8.

FIG. 12 is a partial vertical sectional view through a portion of the machine illustrated in FIGS. 1, 4 and 8.

FIG. 13 is a vertical sectional view taken substantially along the line 13—13 of FIG. 8.

FIG. 14 is a horizontal sectional view taken substantially along the line 14—14 of FIG. 8.

FIG. 15 is a partial elevational view of the apparatus illustrated in FIG. 14.

FIG. 16 is a diagrammatic perspective view showing the manner of forming the tube from the paper like strip.

FIG. 17 is an exploded view showing the composition of the laminate of the paper like strip.

FIG. 18 is a partial sectional view showing the longitudinal seam of the paper like tube.

FIG. 19 is a perspective view of the ultimate filled package.

FIG. 20 is a vertical sectional view through the bottom portion of the machine as illustrated in FIGS. 1 and 2 and taken substantially along the line 20—20 of FIG. 2.

FIG. 21 is a horizontal sectional view taken substantially along the line 21—21 of FIG. 20.

Referring first to FIGS. 1, 2, 4 and 8, one form of a packaging machine is generally designated at 10, this machine corresponding generally to the packaging machine disclosed in the aforementioned Patent Nos. 2,741,079 and 2,738,631. It includes a main housing 11 and a vertical frame 12 extending upwardly therefrom, the frame 12 including a pair of upright posts. A guide roll 13 is rotatably mounted at the top of the frame 12. On one side of the frame 12 and at a position therebelow the housing 11 is provided with a bracket 14 which rotatably carries a shaft 15 upon which is mounted a sleeve 16 of a roll 17 comprising a strip 18 of a gas and liquid impervious paperlike material, the construction of which will be pointed out more fully hereafter. Also mounted on the shaft 15 is a pair of discs or collars 19, one on each side of the roll 17. The inner surfaces of the discs 19 are tapered as indicated at 20, and these discs operate to guide the roll 17 and the strip 18 being unrolled therefrom.

The paperlike strip 18 extends upwardly along one side of the vertical frame 12 from the roll 17 over a roller 22 carried by a bracket 23 and a roller 24 carried by a bracket 25 to the guide roll 13 and then downwardly along the other side of the vertical frame 12. A pair of depending rods 26 extending downwardly along the vertical frame 12 and converging toward their bottoms are engaged by the descending paperlike strip 18 to aid in forming the strip 18 into a tubular configuration, a tube being formed by an upper forming ring 27 and a lower forming ring 28. The paperlike tube, formed from the paperlike strip 18, is designated at 29. The side of the paperlike strip 18 which faces the vertical frame 12 and which forms the inside of the paperlike tube 29 is coated with a thermoplastic material and the edges of the paperlike strip overlap each other as the tube 29 is so formed. Between the upper and lower forming rings 27 and 28 is a heater 30, and a roller 31, carried by a spring arm 32 secured to the liquid food product filling pipe 33, presses the overlapping edges of the tube 29 against the heater 30 for heat sealing the edges together. Thus, the heater 30 and the spring pressed roller 31 form a longitudinal heat sealing means for longitudinally heat sealing the overlap seam of the tube 29, the longitudinal heat sealed seam being designated at 34. The heat sealed tube 29 continuously descends into the housing 11 where the formation of the containers and the filling of the containers are accomplished.

The mechanism for so doing is illustrated in FIGS. 20 and 21. A plurality of shafts 36, 37, 38 and 39 are journaled within the housing 11 and they are suitably driven, as by gears 40. The shafts 36, 37, 38 and 39 respectively carry sprocket wheels 41, 42, 43 and 44 which in turn respectively carry chains 45, 46, 47 and 48. The chains 45 and 46 carry a plurality of heat sealing devices 49 and 50 and the chains 47 and 48 carry a plurality of heat sealing devices 51 and 52. The heat sealing devices 50 and 51 are provided with heating elements and these heat sealing devices are brought against their opposite heat sealing devices 49 and 52 at the center of the housing 11 as the chains are advanced by their sprocket wheels. In so doing, the heat sealing devices transversely grip the descending paperlike tube 29 so as to transversely heat seal the paperlike tube at intervals to form tetrahedron shaped containers 55 as shown in FIG. 19 and 20. The transverse heat seals formed by the transverse heat sealing devices 49 and 50 are designated at 56 and the transverse heat seals formed by the transverse heat sealing devices 51 and 52 are designated at 57. The filling pipe 33 extends downwardly through the paperlike tube 29 into the housing 11 and the liquid food product is continuously supplied into the paperlike tube 29 at a point just above the formation point of the transverse heat seals. As a result, the containers formed by the apparatus illustrated in FIGS. 20 and 21 are simultaneously filled, during the forming, with the liquid food product. The filled formable tetrahedron packages are conveyed by a conveyor 59 (FIGS. 1 and 2) to a mechanism 60 where the packages are separated along the transverse heat seals 56 and 57 and discharged into suitable packing receptacles carried by a turn table 61. The machine thus far described corresponds to the machines of the aforementioned Patents 2,741,079 and 2,738,631 and, per se, is not the invention of applicant, with the exception of the tapered discs 19 for guiding the roll 17 and the paperlike strip 18.

In order to package for long time keeping without refrigeration a heat treated liquid food product, such as a sterilized liquid food product which is subject to deterioration upon contact with extraneous oxygen, it is necessary to provide a package which is impervious to gas and liquid so that the package will not deteriorate because of the liquid contained therein and will not breathe so as to allow extraneous oxygen to contact the food product therein. In this respect, one form of gas and liquid impervious type container, which has proven to be particularly successful, consists of a laminate which is illustrated in FIG. 17. There, the paperlike strip 18 includes an outer kraft paper layer 63 which is coated on its outside with wax 64 and an inner layer of metal foil 65, such as aluminum foil, which is adhered to the outer kraft paper layer, as by heat sealing with a thermoplastic material, such as polyethylene. The inner surface of the metal foil 65 of the laminate is coated with a thermoplastic material 67, such as polyethylene. The metal foil and paper laminate is so arranged in the roll 17 that the inner metal foil portion thereof faces the vertical frame 12 as it ascends and descends and so that the inner metal foil portion forms the inside of the tube 29. Since the metal foil layer is coated with thermoplastic, the liquid food product within the package does not directly contact the metal foil and the heat sealing of the packages is readily accomplished. The metal foil paper laminate provides a sturdy package for the liquid food product which may be readily handled and shipped and it provides a package which is substantially free from wetting by the liquid food product therein and from breathing so that the extraneous oxygen does not contact the liquid food product in the package. All of this is accomplished at relatively low cost, considerably cheaper than the cost of metal cans and the like.

Because the liquid food product being packaged is a sterilized product and must be maintained substantially sterile, the paperlike laminate strip 18 must also be sterilized. However, the usual heat sterilization cannot be conveniently utilized because of the detrimental effects of heat upon the laminate. In accordance with this invention the laminate strip 18 is sterilized by subjecting the same to sterilizing chemicals and sterilizing rays. As shown in FIGS. 1 and 4, a spray nozzle 70 is located adjacent the roll 17 and operates to spray a sterilizing chemical upon the plastic coated metal foil side of the laminate strip 18 which faces the vertical support 12 and which forms the inside of the tube 29. The sterilizing chemical is supplied to the spray nozzle 70 through a pipe 71 and the spraying of the sterilizing chemical on the laminate strip is afforded by compressed air supplied to the spray nozzle 70 through a pipe 72.

Any suitable sterilizing chemical may be utilized, such as chlorine compounds, iodine compounds or quaternary ammonium compounds. Especially good results have been obtained by using hypochlorites, such as calcium hypochlorite and sodium hypochlorite, as the sterilizing chemical. The hypochlorites are less selective in their activity against a wide variety of bacteria than are the iodoforms or the quaternaries. They rapidly destroy coliforms, thermodurics, psychrophilics, spores and bacteriophages. Their efficiency is not as greatly affected by calcium or magnesium ions as the iodoforms. These chlorine compounds do not have any adverse effect on the polyethylene coating, at least they do not have any adverse effect when the exposure is for extended periods of time. Experiments demonstrate that the hypochlorites completely inactivate *streptococcus cremoris* phage in 15 seconds at 50 p.p.m., in 30 seconds at 25 p.p.m. The concentration of the hypochlorites may be increased to at least 500 p.p.m. without harmful effects so that complete chemical sterilization may be afforded. A few organisms, such as *Pseudomonas fluorescens*, are resistant to the action of hypochlorite chemicals, but the addition of 1.35 to 4.0 percent crystalline sodium bromide to the hypochlorite solution makes the same effective with respect to such organisms and greatly increases the effectiveness of the sterilizing chemical. Preferably, the sterilizing hypochlorite chemical is sprayed onto the polyethylene coated metal foil side of the laminate strip in a fine spray or fog so as to completely wet the surface with the chemical. The spray nozzle 70 is preferably of the stainless steel type so as to be resistant to the corrosive action of the chlorine. By so wetting the polyethylene coated surface of the laminate strip 18 immediately after it clears the roll 17 with a uniform covering of the fine spray, the sprayed surface will be exposed to the action of the sterilizing chemical until the laminate strip moves over the top roll 13. Since the laminate strip is under pressure when going over the roll 13 and due to the fact that the polyethylene coated side of the laminate strip contacts the roll surface, the sterilizing chemical solution is ironed off at that point, at least to a considerable degree. If any sterilizing solution remains upon the laminate strip 18 after it passes over the roll 13, it is wiped therefrom by a squeegee 73 located adjacent the roll 13. It takes substantially 25 to 30 seconds for the laminate strip 18 to travel from the roll 17 to the roll 13 which is adequate time for the hypochlorite solution to completely sterilize the polyethylene side of the laminate strip by the time it leaves the top roll 13.

There is still the problem of maintaining the polyethylene coated side of the laminate strip sterile until the time the containers are formed, filled and sealed some time later. One way of overcoming reinfection would be to house the machine in a closed room where all air is filtered and sterilized but this would be a comparatively expensive method. It has been found that reinfection can be avoided by exposing the sterilized side of the laminate strip to sterilizing rays as it descends from the top roll 13 to the point where the containers are formed and filled. Towards this end, a sterilizing lamp 74, such as an ultra-violet germicidal lamp, is carried by the vertical frame 12, this lamp being provided with a reflector 74a for concentrating the sterilizing rays on the sterile surface of the descending laminate strip. These sterilizing rays operate to kill any airborne or other bacteria that may have come in contact with the sterile surface of the laminate strip after it left the upper roll 13. If desired, an additional sterilizing lamp may be arranged below the lamp 74 so as to insure against any possible reinfection. The germicidal lamp or lamps have a temperature near the walls thereof of approximately 110 degrees F. and the heat therefrom operates to dry any sterilizing chemical on the laminate strip after it has passed over the upper roll 13.

In order to insure a strong longitudinal seam 34 in the tube 29 and the resulting containers 55 it is desirable to have the overlapping edges of the laminate strip 18 completely dry so that they may be readily heat sealed together. Toward this end, a blower 75 is carried by a bracket 76 secured to the vertical frame 12 (FIG. 10) and is provided with a nozzle portion 77 for directing a blast of hot air on one edge of the laminate strip 18. Another blower 78 (FIG. 11) is secured to the vertical frame 12 by a bracket 79 and is provided with a nozzle portion 80 for directing a blast of hot air against the other edge of the laminate strip 18. These blasts of hot air throughly dry the edges of the laminate strip to aid in the formation of the strong longitudinal heat seal seam 34. The air is preferably heated to a temperature in excess of 300 degrees F. and since the air is also subjected to the sterilizing rays of the germicidal lamp, reinfection of the sterilized surface during this drying operation is entirely prevented.

To strengthen the longitudinal seam 34, it is also preferable to reinforce the seam with an additional thermoplastic tape such as a polyethylene tape 85, and the manner of so doing is illustrated in FIGS. 8 and 14 to 19. Here, a bracket 82 is suitably secured to the vertical frame 12 and is provided at one end with a pin 83 for rotatably supporting a roll 84 of polyethylene tape 85. The tape 85 extends over a pair of rolls 86 and 87 carried by the other end of the bracket 82, these rolls 86 and 87 having guide flanges 88 and 89 for guiding the tape. A blower 90 is also carried by the bracket 82 and it has a nozzle portion 91 for directing hot air against the tape 85 for heating the same. The rolls 86 and 87 press the heated polyethylene tape 85 against one edge of the polyethylene coated side of the laminate strip 18 and as shown, the tape overhangs the edge. In this way, the tape is secured by heat sealing to the laminate strip. Here, the temperature of the air directed onto the tape is in excess of 300 degrees F. and the air is subjected to the sterilizing rays of the germicidal lamp so that reinfection of the sterilized laminate stripe is prevented. When the longitudinal heat seal seam 34 is formed by the longitudinal heat sealing means 30, 31 and 32 as shown in FIGS. 7 and 13, the thermoplastic tape 85 is heat sealed in the seam and overlaps the same as shown in FIG. 18. Thus, the longitudinal heat seal seam is strongly reinforced and danger of breathing entirely eliminated. Because of the heavy nature of the laminate strip 18 high temperatures are used in the heat sealing of the seam 34, preferably up to 600 degrees F. and even higher so long as there is no burning of the exterior kraft paper of the strip. Instead of forming the seams or seals 34, 56 and 57 by heat sealing, they could be formed by ultrasonic welding which is very effective where metal foils are involved.

The heat treated or sterilized liquid food product of low oxygen content and which is subject to deterioration by contact with extraneous oxygen may be produced, as expressed above, in accordance with the teachings of Roy R. Graves Patent No. 2,772,979 and may be supplied to the filling line 33 by a supply conduit 95 connected to the upper end thereof and extending outwardly between the edges of the laminate strip 18 as it is being formed into the tube 29. The sterilized liquid food product is supplied to the supply conduit 95 through a valve 96 operated by a solenoid 97 and a T-fitting 98 from a supply line 99. A diversion line 100 extends upwardly from the T-fitting 98 to an air tight tank (not shown). The speed of operation of the packaging machine is correlated with the speed of operation of the sterilizing equipment for the liquid food product so that when the solenoid valve 96 is open the sterilized liquid food product is continuously supplied at the proper rate to fill the sterilized packages as they are being formed, the entire packaging process being continuous. When it is desired to stop the operation of the packaging machine, as when a new roll 17 of the laminate strip 18 is being applied to the machine, the solenoid valve 96 is closed and the sterilized food product being continuously delivered is diverted through the diversion pipe 100 to the air tight tank and by reason of the air tight tank, the diverted sterilized liquid food product is in no way contaminated. When the machine is placed in operation again, the solenoid valve 96 is opened to supply the sterilized liquid food product to the sterilized packages as they are being formed. The diversion pipe 100 is preferably made transparent, and the sterilizing equipment is operated at a speed with respect to the speed of operation of the packaging machine to maintain a level in the diversion pipe 100 of about 12 inches above the fitting 98. The speed of operation of the sterilizing equipment is controlled by regulating the speed of operation of the homogenizer thereof and in this way uniform filling of the packages is assured. The solenoid valve 96 may be closed by a liquid level control rod 104 which extends downwardly inside of the paperlike tube 29 to be contacted by the liquid food product in the event that the level thereof rises above a desired value. The liquid level control rod 104 is connected at 105 to operate conventional control equipment (not shown) for opening and closing the solenoid valve 96. The solenoid valve 96 may also be closed by a switch located adjacent the paperlike tube 29 so that if the paperlike tube 29 should be ruptured or should the supply of the paperlike strip be exhausted, the solenoid valve 96 would close to shut off the supply of the sterilized liquid food product.

Also extending downwardly into the paperlike tube 29 is a nitrogen feed line 102 which is connected at 103 to a source of uncontaminated gas which does not react unfavorably with the food product, such as nitrogen or the like. The uncontaminated gas, being heavier than air, impinges upon the sterilized liquid food product in the paperlike tube 29 as it is filling the packages being formed. The uncontaminated gas also fills the paperlike tube 29 and escapes upwardly therefrom. This effectively prevents the entrance of air into the paperlike tube 29 and prevents contact of air with the surface of the liquid food product. The uncontaminated nitrogen gas operates effectively to strip any remaining oxygen from the liquid food product and the surplus uncontaminated gas creates an upward draft in the paper tube 29, which serves as a chimney for its discharge, so as to prevent the entrance of any airborne bacteria below the germicidal lamp 74. The warm air created by the heat from the germicidal lamp 74, in the partially formed tube, will have a tendency to rise and will also create an upward draft in the same direction as that taken by the surplus gas escaping from the formed tube. This also aids in preventing airborne bacteria from contacting the sterilized side of the laminate strip 18. Since the uncontaminated gas completely covers the sterilized liquid food product as it is being packaged, the packages, when sealed closed, may have nitrogen gas above the sterilized liquid food product therein, this nitrogen gas also having a further purging effect in the package.

The procedure for sterilizing the equipment of the aforementioned Roy R. Graves Patent No. 2,772,979 is to pump water through the system with the steam on in the steam heat exchanger and to measure the temperature of the water at progressive points in the operation until the water has reached a temperature of at least 300 degrees F. in the entire processing system. It may take from 25 to 35 minutes to attain this temperature throughout the system. While the water is still in the system, the water is turned off and the milk or other liquid food product is turned on, so that there is no cessation between the water flow and the food product flow. This necessitates the discarding of the intermediate flow which is part water and part food product. When the liquid food product is in full flow, the temperatures of the heat exchangers are adjusted downwardly to the desired temperature of sterilization. During the sterilization of the processing equipment, the steam and hot water are passed through the supply lines 99 and 95 and the filling line 33 and the steam and water emanating from the filling line 33 might cause damage to the equipment in the housing 11 of the packaging machine. This cleaning and sterilizing operation, of course, occurs when the packaging machine 10 is not in operation.

In accordance with this invention a pipe 107 is extended through an opening 109 in the housing 11 and is detachably secured at 108 to the lower end of the filling line 33 as indicated in FIG. 12. Thus, the hot water and steam, during sterilizing and cleaning of the equipment, is conveyed by the detachable pipe 107 to the exterior of the housing 11. Thus, during sterilization of the equipment and the conveying lines for the liquid food product, the hot water and steam goes forward through the solenoid diversion valve 96 into the feed line 33 and is discharged through the removable pipe 107 to the outside of the housing 11. While this sterilization is in process, the packaging machine is not in operation. At the conclusion of the sterilization period, the solenoid diversion valve 96 is closed and the hot water is by passed through the diversion line 100 to the air tight storage tank. The removable pipe 107 is then detached from the lower end of the filling line 33 and removed. The packaging machine is then placed in operation and as soon as it starts forming sterilized containers, the solenoid valve 96 is opened and the sterilized food product is then supplied through the feeding line 33 to the packages as they are being formed. Because of the slippery nature of the polyethylene coated laminate strip 18, there is a tendency for it to slip sidewise in the roll 17. The discs or collars 19 effectively prevent any undue slipping and the tapered faces 20 thereof effectively guide the roll and strip without binding.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. The method of aseptically packaging for long time keeping without refrigeration a sterilized liquid food product having low oxygen content and which is subject to deterioration upon contact with extraneous oxygen, comprising the steps of, chemically sterilizing the thermoplastic coated side of a gas and liquid impervious thermoplastic coated paper type sheet, forming the sheet into a plastic coated paper type sheet, forming the sheet into a gas and liquid impervious container with the sterile thermoplastic side of the sheet on the inside, filling the container with the sterilized liquid food product in an uncontaminated gas asmosphere which does not react unfavorably with the food product, and sealing closed the container with said gas atmosphere above the food product.

2. The method of aseptically packaging for long time keeping without refrigeration a sterilized liquid food product having low oxygen content and which is subject to deterioration upon contact with extraneous oxygen, comprising the steps of, chemically sterilizing the thermoplastic coated side of a gas and liquid impervious thermoplastic coated paper type sheet, forming the sheet into a gas and liquid impervious container with the sterile thermoplastic side of the sheet on the inside, subjecting the sterilized thermoplastic side of the sheet to sterilizing rays while forming the containers to prevent reinfection thereof, filling the container with the sterilized liquid food product in an uncontaminated gas atmosphere which does not react unfavorably with the food product, and sealing closed the container with said gas atmosphere above the food product.

3. The method of aseptically packaging for long time keeping without refrigeration a sterilized liquid food product having low oxygen content and which is subject to deterioration upon contact with extraneous oxygen, comprising the steps of, chemically sterilizing the metal foil inside of a gas and liquid impervious metal foil and paper laminate, forming the laminate into a gas and liquid impervious container with the sterile metal foil side of the laminate on the inside, filling the container with the sterilized liquid food product in an uncontaminated gas atmosphere which does not react unfavorably with the food product, and sealing closed the container with said gas atmosphere above the food product.

4. The method of aseptically packaging for long time keeping without refrigeration a sterilized liquid food product having low oxygen content and which is subject to deterioration upon contact with extraneous oxygen, comprising the steps of, chemically sterilizing the thermoplastic coated metal foil side of a gas and liquid impervious thermoplastic coated metal foil and paper laminate, forming the laminate into a gas and liquid impervious container with the sterile thermoplastic coated metal foil side of the laminate on the inside, filling the container with the sterilized liquid food product in an uncontaminated gas atmosphere which does not react unfavorably with the food product, and sealing closed the container with said gas atmosphere above the food product.

5. The method of continuously aseptically packaging for long time keeping without refrigeration a sterilized liquid food product having low oxygen content and which is subject to deterioration upon contact with extraneous oxygen, comprising the steps of, continuously advancing a gas and liquid impervious thermoplastic coated paper type strip, chemically sterilizing the thermoplastic side of said continuously advancing strip, forming and heat sealing said continuously advancing strip into a continuously advancnig heat sealed tube with the sterile thermoplastic side on the inside, intermittently transversely heat sealing the continuously advancing tube to progressively form gas and liquid impervious paper type containers having sterile interiors, continuously supplying an uncontaminated gas which does not react unfavorably with the food product into the continuously advancing tube as the containers are being formed to fill the same with an atmosphere of said uncontaminated gas, and continuously filling the containers as they are being formed with the sterilized liquid food product in said uncontaminated gas atmosphere.

6. The method of continuously aseptically packaging for long time keeping without refrigeration a sterilized liquid food product having low oxygen content which is subject to deterioration upon contact with extraneous oxygen, comprising the steps of, continuously advancing a gas and liquid impervious thermoplastic coated paper type strip, chemically sterilizing the thermoplastic side of said continuously advancing strip, forming and heat sealing said continuously advancing strip into a continuously advancing heat sealed tube with the sterile thermoplastic side on the inside, subjecting the sterilized thermoplastic side of the strip to sterilizing rays while forming the tube to prevent reinfection thereof, intermittently transversely heat sealing the continuously advancing tube to progressively form gas and liquid impervious paper type containers having sterile interiors, continuously supplying an uncontaminated gas which does not react unfavorably with the food product into the continuously advancing tube as the containers are being formed to fill the same with an atmosphere of said uncontaminated gas, and continuously filling the containers as they are being formed with the sterilized liquid food product in said uncontaminated gas atmosphere.

7. The method of continuously aseptically packaging for long time keeping without refrigeration a sterilized liquid food product having low oxygen content and which is subject to deterioration upon contact with extraneous oxygen, comprising the steps of, continuously advancing a gas and liquid impervious thermoplastic coated paper type strip, continuously applying a narrow thermoplastic tape along one edge of the thermoplastic side of the strip, chemically sterilizing the thermoplastic side of said continuously advancing strip, forming said continuously advancing strip into a continuously advancing tube with the sterile thermoplastic side on the inside and with the edges of the strip overlapping, heat sealing the overlapping edges of the strip and the thermoplastic tape to form a reinforced longitudinal heat sealed seam for the continuously advancing tube, intermittently transversely heat sealing the continuously advancing tube to progressively form gas and liquid impervious paper type containers having sterile interiors, continuously supplying an uncontaminated gas which does not react unfavorably with the food product into the continuously advancing tube as the containers are being formed to fill the same with an atmosphere of said uncontaminated gas, and continuously filling the containers as they are being formed with the sterilized liquid food product in said uncontaminated gas atmosphere.

8. A package comprising a gas and liquid impervious paper type container having aseptically packaged therein for long time keeping without refrigeration a sterilized liquid food product which is subject to deterioration upon contact with extraneous oxygen, and being made in accordance with the method of claim 1.

References Cited in the file of this patent

UNITED STATES PATENTS

| | | |
|---|---|---|
| 2,303,021 | Butty | Nov. 24, 1942 |
| 2,575,863 | Clifcorn | Nov. 20, 1951 |
| 2,721,019 | Gauvreau | Oct. 18, 1955 |
| 2,738,631 | Jarund | Mar. 20, 1956 |
| 2,741,079 | Rausing | Apr. 10, 1956 |
| 2,761,603 | Fairchild | Sept. 4, 1956 |
| 2,772,979 | Graves | Dec. 4, 1956 |
| 2,816,837 | Holsman | Dec. 17, 1957 |
| 2,918,770 | Stocker | Dec. 29, 1959 |
| 2,928,219 | Gubler | Mar. 15, 1960 |

FOREIGN PATENTS

| | | |
|---|---|---|
| 1,025,324 | Germany | Feb. 27, 1958 |

OTHER REFERENCES

"Refrigerating Engineering," February 1954, page 46, article entitled Packaging and Wrapping Materials.